UNITED STATES PATENT OFFICE 2,557,155

DRYING OF FRUIT OR VEGETABLE MATERIALS

Sumner I. Strashun, El Cerrito, Calif., assignor to the United States of America as represented by the Secretary of Agriculture No Drawing. Application June 20, 1950, Serial No. 169,281

14 Claims. (Cl. 99—206)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the drying of liquid materials of plant origin particularly fruit and vegetable juices. One object of this invention is the provision of processes for drying such materials to obtain free-flowing solid products. Another object is the provision of free-flowing solid compositions of matter containing fruit or vegetable solids. A further object of the invention is to provide a technique for retarding deleterious changes which normally occur during the drying procedure and the storage of the dried products. Additional objects and advantages of this invention will be obvious from the description herein.

It is well known in the food dehydration art that materials such as eggs and milk can be spray-dried to give useful powdered products. However, when this technique, without modification, is applied to fruit or vegetable juices, a serious problem arises. The dried fruit or vegetable material so produced is very hygroscopic. It rapidly absorbs moisture from the air and soon becomes a sticky mass. Upon further standing more moisture is absorbed from the air and a hard cake is formed. The material either in the sticky form or in the form of a hard cake is unsuitable for most uses. It is difficult to remove from the container and its rate of solution is so low that it is difficult to make the reconstituted juice. There is also danger that, in attempting to remove the material from the container with instruments, the material will become contaminated and unfit for use. Another serious problem is that the presence of moisture due to absorption increases the rate of deterioration and the product cannot be stored for long periods of time.

Another important point is that the problem of hygroscopicity is involved in the operation of the spray-drier. Ordinarily, some juices, tomato and citrus juices, for example, cannot be dried by spray drying at all. The dried material clings to the walls of the spray chamber, the ducts, and the collector as a glassy mass so that satisfactory yields cannot be obtained and the equipment must be frequently shut down for cleaning.

These problems have been known to those skilled in the art for a considerable time and various agents, called drying aids, have been proposed to be added to the juice prior to drying in order to alleviate the difficulties. Thus pectin, starch, dextrin, and so forth have been used for such purpose but do not give satisfactory results.

It has now been found that if a small percentage of a fatty acid ester, as hereinafter described, is dispersed in the fruit or vegetable juice and the material then subjected to spray, drum, or other drying procedure, the disadvantages enumerated above are completely eliminated. The small percentage of the fatty acid greatly reduces the hygroscopicity of the products so that the dried fruit or vegetable solids are produced in a free-flowing condition (i. e., the individual particles remain separate) and the product also remains fresh and palatable over a long period of time. The free-flowing property of the material is a great advantage as the material thus can be easily removed from the container, easily weighed, etc. Further, the material dissolves rapidly in water and thus the reconstituted juice can be readily prepared. Moreover when the products of this invention are dissolved in water, the reconstituted juice so formed closely approximates the natural juice. This fact is to be contrasted with the prior art techniques. Thus known processes involve addition of pectin, starch, or dextrin to the juice prior to drying. The reconstituted juice made from the resulting solids tends to be gummy or slimy in nature. It is also known to add cellulose to juice before drying. However, cellulose is not soluble in water and thus must be separated from the reconstituted juice by filtration. It is further noted that the fatty acid esters which I employ are non-toxic, odorless, and tasteless, hence do not affect the nutritive value nor the palatability of the fruit or vegetable solids. It is also to be emphasized that when one of these esters is added to a juice before spray drying, the dry product is obtained in practically quantitative yield, as none of the product clings to the walls of the drying chamber or collector as is the case with many unmodified juices.

A further advantage of my process is that the dried products which I produce can be reconstituted much more rapidly than the dried products produced by known techniques. Thus my products when agitated with a body of water dissolve to form a reconstituted juice in a few minutes.

Another important advantage of using the fatty acid esters as described below is that they retard rehydration of the products during the drying procedure itself. This fact can be explained as follows: In spray-drying, the feed material is atomized into a descending current of hot, relatively dry air. As the particles descend, evaporation of water takes place and as a result, the temperature of the air drops and the relative humidity of the air increases. When an unmodified juice is being dried, the hydroscopic powder produced actually picks up moisture in the cooler parts of the dryer, i. e., the "gooseneck" duct, the cyclone collector and the receiver for the finished product. Thus the final product will emerge from the dryer with considerably higher moisture content than it had earlier in the drying cycle. However, when a fatty acid ester as hereinafter described is added to the juice, this situation is alleviated. The hydrophobic quality of the added fatty acid ester greatly decreases the hygroscopicity of the dry powder produced in the spray chamber so that even when this powder contacts the cooler, moist air in the other parts of the dryer, it does not materially absorb moisture. Thus addition of the fatty acid ester has the further advantage that it gives final products of lower moisture content than would be obtained under the same conditions with the unmodified juice.

In accordance with this invention, I incorporate in the liquid material prior to drying a fatty acid ester of a polyhydric alcohol, said ester containing at least one free hydroxyl group and wherein the fatty acid has 8 to 22 carbon atoms and the polyhydric alcohol has a molecular weight not greater than 1000. In general these esters may be visualized as being composed of two essential parts, i. e., the fatty acid, or hydrophobic, portion and the polyhydric alcohol, or hydrophilic, portion. Both of these moieties are required to give the compound the desired properties, namely, that the compound have sufficient hydrophilic properties so as to be soluble in the liquid to be dried and also have sufficient hydrophobic properties to reduce the hygroscopicity of the dried product. As stated above, the fatty acid component of the ester may contain 8 to 22 carbon atoms and thus may be derived, for example, from the following acids: caprylic, pelargonic, capric, undecylic, lauric, tridecylic, myristic, pentadecylic, palmitic, margaric, stearic, nondecylic, arachidic, oleic, palmitoleic, ricinoleic, and so forth. It is not essential to employ pure, individual fatty acids but the esters may be derived from mixtures of fatty acids such as obtained by hydrolysis of fats and oils. The polyhydric alcohol portion of the ester may be derived from any one of a series of alcohols, as for example, ethylene glycol, propylene glycol, butylene glycol, glycerol, pentaerythritol, mannitol, sorbitol, diethylene glycol, triethylene glycol, tetraethylene glycol, pentaethylene glycol, hexaethylene glycol, heptaethylene glycol, octaethylene glycol, nonaethylene glycol, decaethylene glycol, other polyalkylene glycols, diglycerol, triglycerol, and so forth. In many cases derivatives of mixtures of polyhydric alcohols may be used. Thus in the case of polyglycols and polyglycerols these materials are available as mixtures of homologous compounds and are useful in that state for preparing the esters by applying conventional esterification techniques. Some of the particular esters which I may use are listed below merely by way of example: glyceryl mono caprylate, glyceryl mono caprate, glyceryl mono laurate, glyceryl mono myristate, glyceryl mono palmitate, glyceryl mono margarate, glyceryl mono stearate, glyceryl mono oleate, glyceryl mono arachidate, glyceryl dicaprylate, glyceryl dicaprate, glyceryl dilaurate, glyceryl dimyristate, glyceryl dipalmitate, glyceryl dimargarate, glyceryl distearate, glyceryl dioleate, glyceryl diarachidate, ethylene glycol monocaprylate, ethylene glycol monocaprate, ethylene glycol monolaurate, ethylene glycol monomyristate, ethylene glycol monopalmitate, ethylene glycol monomargarate, ethylene glycol monostearate, ethylene glycol monooleate, ethylene glycol monoarachidate, diethylene glycol mono-caprylate, diethylene glycol mono-caprate, diethylene glycol mono-laurate, diethylene glycol mono-myristate, diethylene glycol mono-palmitate, diethylene glycol mono-margarate, diethylene glycol mono-stearate, diethylene glycol mono-oleate, diethylene glycol mono-arachidate, tetraethylene glycol mono-caprylate, tetraethylene glycol mono-caprate, tetraethylene glycol mono-laurate, tetraethylene glycol mono-myristate, tetraethylene glycol mono-palmitate, tetraethylene glycol mono-margarate, tetraethylene glycol mono-stearate, tetraethylene glycol mono-oleate, tetraethylene glycol mono-arachidate, and so forth.

My process is of wide versatility and may be used in the drying of any fruit or vegetable material in the form of juices, extracts, infusions, concentrates, pulps, purees, and so forth. The concentration of the fatty acid ester dispersed in the material to be dried depends on the particular material in question. In general the concentration of the fatty acid ester should be from about 0.1% to about 5%, based on the solids content of the material to be processed. In general fruit juices will require a higher concentration of fatty acid ester than will vegetable juices. In the case of citrus juices a concentration of about 2–3% is preferred as being a low concentration yet one giving good results.

Another problem with which this invention is concerned is the matter of development of off-flavors during the drying procedure or when the dried products are stored. In some instances citrus juices, for example, the dried product produced by prior techniques has an objectionable hay-like odor. This odor develops during the drying and is believed to be caused by oxidation of the carotenoid constituents in the juice. I have found that the tendency for development of off-flavors can be reduced and in some cases eliminated by incorporating in the juice an anti-oxidant. In most cases the anti-oxidants are water-insoluble compounds and hence are not compatible with edible liquids such as fruit or vegetable juices. However, the fatty acid esters which I use to promote the efficiency of drying and stability of the dried products are a key to this situation. Thus when an anti-oxidant is to be used, it is first mixed with the fatty acid ester, the latter being warmed to melt, if a solid. The anti-oxidant readily dissolves therein because of balanced hydrophobic-hydrophilic properties of the fatty acid ester. The resulting mixture is then incorporated with the juice to be dried by suitable agitation. In this incorporation step, the fatty acid ester acts as an emulsifying agent whereby the normally water-insoluble antioxidant can be uniformly dispersed into the juice. The proportion of antioxidant required in any particular case will depend on the type of liquid being dried, its susceptibility to development of off-flavors, and the particular antioxidant used. In most cases, only a small concentration is required, i. e., from about 0.01% to about 0.5% based upon the solids content of the liquid to be dried. Many different agents may be employed as the antioxidant as for example, butylated hydroxyanisole; gallic acid; N-tetra (carboxymethyl) ethylene diamine, and the salts thereof; methyl salicylate; dilauryl thiodipropionate; chlorogenic acid; catechol monobenzoate; cysteine hydrochloride; N,N'-di-sec-butyl-p-phenylene diamine; 2-tert-butyl, 4-methoxy phenol; p-isoproxy diphenylamine; 2,5-ditertiarybutyl hydroquinone; 2,5-dibenzyl hydroquinone; 2,5-ditertiaryamyl hydroquinone; diphenyl p-phenylene diamine; p-hydroxy diphenylamine; N-sec-butyl p-aminophenol; ethyl hydrocaffeate; ethyl gallate; lauryl gallate; thiodipropionic acid; 6-ethoxy-2,2,4-trimethyl-1,2-dihydroquinoline; 6-phenyl-2,2,4-trimethyl-1,2-dihydroquinoline; 2,2,4-trimethyl-1,2-dihydroquinoline; nordihydroguaiaretic acid; p-tert-butyl catechol; and so forth.

The following examples demonstrate particular conditions, steps, and materials within the scope of this invention. These examples illustrate procedures found to give satisfactory results but are not to be taken as a limitation of the scope of this invention to these particular procedures.

The rehydration tests referred to in the examples were carried out by placing 15 grams of the dried material and 85 grams of water in a jar and rotating the jar at a constant speed of 55 R. P. M. while noting the time required to obtain rehydration as indicated by solution of the powder and disappearance of all granular particles.

*Example I*

To a lot of orange juice (solids content 13%) was added glyceryl monostearate in a concentration of 1% based on the solids content of the juice. The resulting mixture was vigorously agitated to uniformly disperse the glyceryl monostearate in the juice. The resulting juice was then spray dried in a conventional laboratory-size spray drier at a rate of 25 grams of feed per minute, using a hot air inlet temperature of 150° C. and an exhaust air temperature of 35° C. The dry product was obtained as a free-flowing powder having a moisture content of 3%.

This product was found to have a rehydration time of 3½ minutes. On the other hand, a control sample prepared by drying under the same conditions, orange juice containing 1% added methyl cellulose had a rehydration time of 15 minutes.

*Example II*

The process of Example I was repeated several times using different concentrations of glyceryl monostearate, namely, 2% and 4%. The products in each case were free-flowing powders and had a rehydration time of 2.5 minutes.

*Example III*

To a lot of concentrated tomato juice was added glyceryl monostearate in a concentration of 2% based on the solids content to the juice. After thorough agitation the treated juice was spray dried at the rate of 25 grams per minute using a hot air inlet temperature of 150° C. and exhaust air temperature of 35° C. The dried tomato product was obtained as a free-flowing powder and had a good tomato odor and taste.

The expression "edible liquid material of plant origin" is used herein to mean juices, concentrates, extracts, infusions, pulps, purees, and similar forms of fruits and vegetables.

Having thus defined my invention, I claim:

1. A process for preparing a free-flowing dried food product which comprises dispersing in an edible liquid material of plant origin a fatty acid ester of a polyhydric alcohol, said ester containing at least one free hydroxyl radical and wherein the fatty acid contains 8 to 22 carbon atoms and the polyhydric alcohol has a molecular weight not greater than 1000, then drying the material containing the dispersed ester.

2. A process in accordance with claim 1 wherein the concentration of the fatty acid ester is from about 0.1% to about 5% based on the solids content of the edible liquid material.

3. A process for preparing a free-flowing dried food product which comprises dispersing in an edible liquid material of plant origin a fatty acid ester of a polyhydric alcohol, said ester containing at least one free hydroxyl radical and wherein the fatty acid contains 8 to 22 carbon atoms and the polyhydric alcohol has a molecular weight not greater than 1000, then spray drying the material containing the dispersed ester.

4. A process in accordance with claim 3 wherein the concentration of the fatty acid ester is from about 0.1% to about 5% based on the solids content of the edible liquid material.

5. A process in accordance with claim 3 wherein the edible liquid material is juice of a citrus fruit.

6. A process in accordance with claim 3 wherein the edible liquid material is orange juice.

7. A process in accordance with claim 3 wherein the edible liquid material is tomato juice.

8. A process in accordance with claim 3 wherein the fatty acid ester is glyceryl monostearate.

9. A process for preparing a free-flowing dried food product which comprises dispersing in an edible liquid material of plant origin, an antioxidant, and a fatty acid ester of a polyhydric alcohol, said ester containing at least one free hydroxyl radical and wherein the fatty acid contains 8 to 22 carbon atoms and the polyhydric alcohol has a molecular weight not greater than 1,000, then drying the material containing the dispersed anti-oxidant and ester.

10. A readily dispersible, free-flowing solid food product containing as its principal ingredients evaporated edible liquid material of plant origin and a fatty acid ester of a polyhydric alcohol, said ester containing at least one free hydroxyl radical and wherein the fatty acid contains 8 to 22 carbon atoms and the polyhydric alcohol has a molecular weight not greater than 1,000.

11. A readily dispersible, free-flowing solid food product containing as its principal ingredients evaporated edible liquid material of plant origin and from about 0.1% to about 5% of a fatty acid ester of a polyhydric alcohol said ester containing at least one free hydroxyl group and wherein the fatty acid contains 8 to 22 carbon atoms and the polyhydric alcohol has a molecular weight not greater than 1,000.

12. A readily-dispersible free-flowing solid food product containing as its principal ingredients dried fruit solids and a fatty acid ester of a polyhydric alcohol, said ester containing at least one free hydroxyl radical and wherein the fatty acid contains 8 to 22 carbon atoms and the polyhydric alcohol has a molecular weight not greater than 1,000.

13. A product in accordance with claim 12 wherein the fatty acid ester is glyceryl monostearate.

14. A readily-dispersible, free-flowing solid food product containing as its principal ingredients evaporated edible material of plant origin, an antioxidant and a fatty acid ester of a polyhydric alcohol, said ester containing at least one free hydroxyl radical and wherein the fatty acid contains 8 to 22 carbon atoms and the polyhydric alcohol has a molecular weight not greater than 1,000.

SUMNER I. STRASHUN.

REFERENCES CITED

The following references are of record in the file of this patent:

UNITED STATES PATENTS

| Number | Name | Date |
| --- | --- | --- |
| 1,800,501 | Bornegg | Apr. 14, 1931 |
| 2,367,131 | Leo | Jan. 9, 1945 |